MAGNETIC TRANSDUCER HEAD ASSEMBLIES

Filed Sept. 12, 1961

INVENTORS
GEORGE D. CHENEY &
BY THEODORE C. FOSTER
Bower & Patalidis
ATTORNEYS

United States Patent Office 3,140,362

Patented July 7, 1964

3,140,362

MAGNETIC TRANSDUCER HEAD ASSEMBLIES

George D. Cheney, Orchard Lake, and Theodore C. Foster, Northville, Mich., assignors to Ex-Cell-O Corporation, Detroit, Mich.

Filed Sept. 12, 1961, Ser. No. 137,651

6 Claims. (Cl. 179—100.2)

The present invention relates in general to new and improved magnetic transducer head assemblies, and more particularly to means of mounting magnetic transducer heads in close proximity to, but out of contact with, a magnetizable record surface.

In the art of recording and reproducing data or information by means of magnetic transducer heads mounted in close proximity to a moving magnetic record surface it is essential to maintain between the magnetic flux emitting pole pieces of the transducer heads and the magnetizable record surface a spacing, or air gap, which is accurate, uniform from magnetic head to magnetic head, constant over a long period of time for any given magnetic head, and as narrow as possible, while preventing actual contact between the pole pieces and the record surface in order to minimize damage to both sets of components.

The air gap must be narrow in order to permit high density recording without spreading to adjacent tracks that may cause cross-talk, while supplying strong recording and playback characteristics. The air gap must be uniform from one magnetic head to another and must remain constant for any given head over a long period of time in order to provide uniform and constant recording and playback levels. Runout, wobble, thermal expansion and vibration of the support of the moving record surface destroy any attempt at recording high density magnetic data bits where transducer heads are fixedly mounted in such a way that they are prevented from following the irregularities of the record surface. The problem is further complicated in magnetic drum recording devices where the drum usually expands radially when in operation due to centrifugal growth adding its effect to thermally induced radial expansion.

It is well known that a rapidly moving record surface of the type commonly used in random access magnetic data recording devices, such as magnetic drums and discs, generates a laminar flow of the layer of air or gas fluid clinging to the record surface and set in motion by frictional interaction. The rapidly moving layer of fluid creates a hydrodynamic force that may be used to cause a transducer head resiliently supported from a fixed mounting to "fly" or float at a predetermined distance from the record surface.

The prior art discloses several modes by which magnetic transducer heads are thus caused to "fly." However many problems are encountered in devising fluid bearing means for supporting transducer heads, in providing adjustments of the transducer resilient support, precise alignment of the magnetic gaps, and fail safe mechanisms that prevent accidental contact between the transducers and the easily damaged magnetizable surface of the record medium. The transducer head must often be encased in a bearing pad in order to cause it to "fly," the adjustment of the parallelism of the bearing pad with the record surface is rather delicate, the adjustment of the biasing force tending to force the pad towards the record surface is critical and the longitudinal and lateral adjustments of the position of the magnetic gap often lack precision.

The present invention does away with the inconveniences of previous so-called flying or aerodynamic magnetic transducer heads by providing an improved and novel means of supporting a transducer head by way of two parallel adjustable spring reeds, one above the other. The present invention requires no auxiliary bearing pad to hydrodynamically support a transducer head and it provides positive longitudinal and lateral positioning of the magnetic gap in relation to a magnetic record surface.

It is therefore a principal object of the present invention to provide an improved device for positioning a magnetic transducer close to, but out of contact from, a rapidly moving record surface.

It is another object of the present invention to provide an improved device for positioning a magnetic transducer close to a moving record surface by utilizing the bearing action of the fluid flow caused by the motion of the record surface.

It is a further object of the invention to provide a magnetic transducer which maintains a spacing from a record surface that remains constant in spite of any irregularities of the latter.

It is an additional object of the invention to provide a free floating transducer head, without requiring the transducer head to be encased in a large and cumbersome bearing pad or shoe.

It is a further object of the invention to provide a free floating transducer head that is supported away from a fixed, although adjustable, mounting, by means of two parallel flat spring members forming, in combination with the transducer head body and the spring members anchoring points, a parallelogram resiliently deformable in one plane only, thereby maintaining at all times the magnetic gap properly oriented and the transducer head body substantially normal to the record surface.

It is yet another object of the invention to provide a transducer head having the advantages above mentioned and which is easy and relatively cheap to manufacture, and substantially safe and trouble free to use.

Other objects and advantages will be pointed out in the following description and claims and in the accompanying drawings which illustrate, by way of example, the principle of the invention and the best mode which has been contemplated of applying that principle to a magnetic data storage device of the magnetic drum type with which the invention is best adapted to be advantageously utilized, although it is obvious that the same principle could be used in combination with a magnetic data storage device of the magnetic disc type.

In the drawings, in which like numerals refer to like parts:

Figures 1, 2, 3:
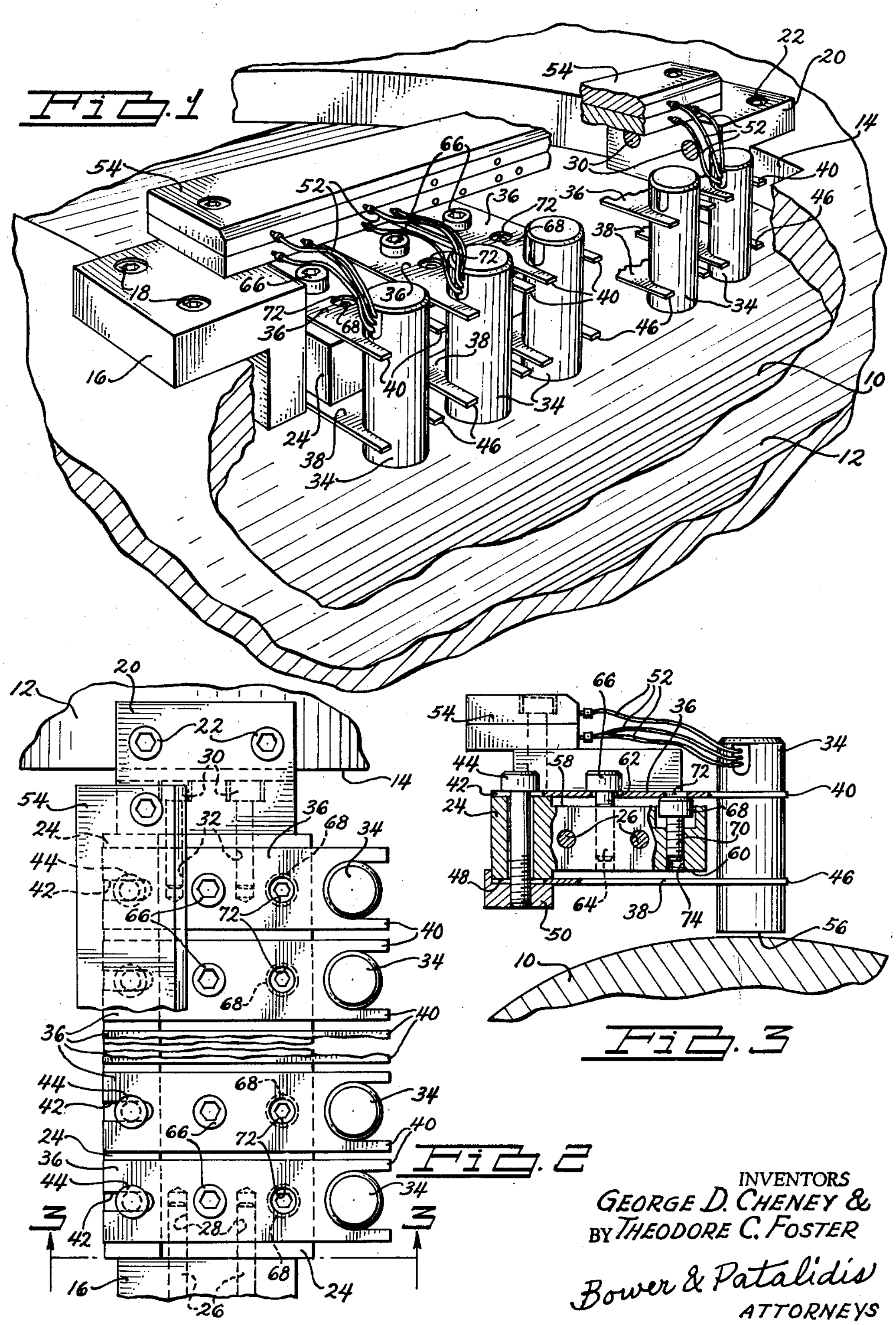
FIG. 1 represents a perspective view of one embodiment of the present invention, as contemplated to be used in combination with a magnetic drum, and with portions broken away for more clarity.
FIG. 2 is a top plan view of the embodiment of FIG. 1, with some elements omitted or broken away for more clarity.
FIG. 3 is an end view from line 3—3 of FIG. 2, with portions broken away to show the internal construction.

With reference to the drawings, FIG. 1 illustrates a portion of a magnetic data storage device consisting of a rotatable drum 10 with a magnetizable surface layer thereon. The drum is contained in an enclosure or housing 12 having apertures such as 14 for mounting of transducer heads for the purpose of recording and reading magnetic bits of information on the drum magnetizable surface layer.

Inverted L-shaped mounting brackets 16 and 20 are fastened to the housing by means of the screws 18—18 and 22—22. A transducer head mounting beam 24 extends between the brackets to which it is fastened by means of screws such as 26—26 threading in tapped holes 28—28 (FIG. 2), and 30—30 threading in tapped holes 32—32.

With reference to FIGS. 1–3, it can be seen that one or more magnetic transducers 34 can be mounted on each mounting beam 24 by means of two substantially parallel flat springs or reeds 36 and 38. One end of the upper flat spring 36 is bifurcated, and two projecting legs 40—40 partly surround the body of the transducer head 34 to which they are soldered, cemented or otherwise fastened. The other end of the upper flat spring 36 has a slot 42 for mounting upon the mounting beam 24 by means of a bolt or screw 44. The lower flat spring 38 is similarly bifurcated at one end, with legs 46—46 fastened to the body of the transducer head 34 and has a mounting slot 48 (FIG. 3) on the other end for mounting upon the mounting beam by means of the bolt or screw 44 cooperating with a flanged nut 50.

The necessary electrical connections to the winding coil (not shown) of each transducer head 34 is effected by means of wires 52 leading into a connector bar 54 fastened to the mounting brackets 16–20. The internal construction of the transducer heads forms no part of the present invention and is the subject matter of co-pending application Serial No. 754,762, filed August 13, 1958 by David J. Carpenter, which has now matured as Patent No. 3,026,379, and co-pending application Serial No. 142,419, filed October 2, 1961, by Theodore C. Foster and Joseph E. Smith, Jr.

The portion of the transducer body proximate the magnetizable surface on the drum, or shoe portion 56 of the transducer, is preferably coated with a smooth lapped plastic material (such as, for example, "Fluorosint," a trademark of the Polymer Corporation for a tetrafluoroehtylene-ceramics mixture) which is unctuous, wear resistant and not damaging to the magnetizable surface in case of accidental contact therewith. When coacting with a cylindrical drum, the shoe portion 56 is preferably flat or is lapped with a slight sphericity having its convexity directed towards the drum surface, as it has been found experimentally that such surfaces enable the transducer head to be improvedly borne by the flow of laminar fluid set in motion by the rotation of the drum and rushing past the shoe portion 56 between the latter and the surface of the drum.

The mounting beam 24 has an upper undercut surface portion 58 to prevent interference with the motions of the upper flat spring 36, and a lower undercut surface portion 60 to similarly prevent interference with the motions of the lower flat spring 38, as more clearly shown in FIG. 3. The upper flat spring 36 has a hole 62 for passage therethrough of an adjusting screw 64 threading into the narrow portion of the mounting beam 24. The head 66 of the screw 64 is adapted to press against the upper face of spring 36, bending spring 36 downward, thereby enabling shoe portion 56 to be adjustable toward the surface of drum 10.

The amount by which the transducer head shoe portion 56 is adjustable toward the surface of the drum is limited by the head 68 of a screw 70, disposed under the lower face of the upper flat spring 36, which is threadable into a tapped hole 74 in the narrow portion of the mounting beam 24. An access hole 72 disposed in the flat spring 36 enables a wrench to be introduced therethrough for adjusting screw 70, for the purpose to be described hereinafter.

The transducer head assemblies are mounted as indicated and are longitudinally and laterally adjusted and alined. The proportions and dimensions of the elements are such that the shoe portion 56 of the transducer is a certain distance away from the record surface with the screw 64 having its head out of contact with the upper face of spring 36 and the screw 70 threaded into hole 74 with its head 68 not touching the lower face of spring 36.

Drum 10 is brought to operating speed and left to run at such speed for some time before any adjustment is attempted. This enables the drum and other components to reach a normal operating temperature and to be thermically and dynamically stabilized. Screw 64 is then drawn in, biasing the upper spring 36 and consequently also the lower spring 38 until the shoe portion 56 barely clears the surface of the drum 10. The laminar film of fluid flowing under the shoe portion 56 of the transducer body is now supporting the transducer head against the biasing force of the flat springs and it is the equilibrium of the biasing force in one direction and of the lifting force of the fluid film in the opposite direction that maintains the shoe portion 56 in close juxtaposition to, but out of contact from, the record surface.

If the rotation of the drum was now reduced, the velocity of the laminar film of fluid would also be reduced to a point where it could no longer sustain the transducer head by its lifting action upon the surface of the shoe portion 56. The centrifugally induced radial growth of the drum would also be reduced, but not by such an amount that the shoe portion 56 would be prevented from contacting the surface of the drum. To prevent contact between the shoe portion of the transducer and the magnetizable surface on the drum, screw 70 is rotated until the upper surface of its head 68 contacts the lower surface of spring 36. Screw 70 is then backed away slightly, by being turned a few degrees in the opposite direction, to prevent interfering with the free bending movements of the springs.

The drum can now be brought to a standstill without fear of the shoe portion 56 ever touching the surface of the drum, as the permissible travel of the transducer towards the drum is now limited by the stop or abutment of the head 68 of screw 70.

The adjusting operation is greatly facilitated by observing by means of an oscilloscope the signal read by the transducer, and a plurality of transducers can be adjusted for identical performances by balancing their signal levels. Those signals need not be previously recorded on the drum as it is well known that even a virgin magnetic coating provides a so-called background noise.

It can be seen by the above description that the transducer head of the transducer head assembly of the invention is maintained yieldably in a radial direction, while being maintained substantially firmly in longitudinal and lateral directions.

It is obvious that expressions such as "upper," "lower," "top," "bottom," are relative terms and are herein used for the sake of simplifying the description of the invention in reference to the accompanying drawings, as it is evident that the transducer head assembly of the invention may be mounted in any position whatsoever.

While there has been shown and described and pointed out the fundamental novel features of the invention as applied to the preferred embodiment, it will be understood that various omissions and changes and substitutions in the form and details of the device illustrated may be made by those skilled in the art without departing from the spirit and scope of the invention. Consequently, the invention herein disclosed is to be construed as limited only by the spirit and scope of the appended claims.

What is claimed as new is:

1. Apparatus for supporting at least one magnetic transducer head a predetermined distance away from a moving record surface by utilizing the bearing fluid set in motion by the movement of said record surface, said apparatus comprising in combination: said magnetic transducer head encased in a substantially cylindrical enclosure, said magnetic transducer head being provided with an integral shoe portion for support by said bearing fluid; a couple of resilient flat springs parallelly disposed in spatial relationship one above the other in planes substantially orthogonal to the axis of the cylindrical enclosure of said magnetic transducer head, each of said springs having one end bifurcated for surrounding a portion of the periphery of said cylindrical enclosure for fastening thereon; a mounting beam member for clamping thereon of the other end of each of said resilient flat springs; and at least one inverted L-shaped mounting bracket for fixedly supporting said mounting beam member by at least one end thereof.

2. The apparatus of claim 1 wherein one of said flat springs includes a first limit stop adapted to adjustably bias said transducer head toward said record surface and a second limit stop adapted to limit such travel toward said record surface.

3. Apparatus for supporting at least one magnetic transducer head a predetermined distance away from a moving record surface by utilizing the bearing fluid set in motion by the movement of said record surface, said apparatus comprising in combination: said magnetic transducer head encased in a substantially cylindrical enclosure with a shoe portion for support by said bearing fluid, said shoe portion being the end of said substantially cylindrical enclosure housing the pole pieces of said transducer head; a first and a second resilient flat reeds parallelly disposed in spatial relationship one above the other in planes substantially normal to the axis of said enclosure; one end of said first and second resilient flat reeds being cut out for encircling at least a portion of the periphery of said cylindrical enclosure for fastening thereon; the other end of said first and second resilient flat reeds having a slot; a mounting beam member supported on both ends by inverted L-shaped mounting brackets; said mounting beam member having an enlarged portion forming an upper and a lower clamping surfaces; a clamping screw adapted to be introduced through a hole in said enlarged portion and through the slots on the end of said first and second resilient flat reeds for clamping of said first reed between the head of said clamping screw and said upper clamping surface and for clamping of said second reed between a flanged nut threaded upon the end of said clamping screw and said lower clamping surface; a first limit stop adapted to coact with said first reed to adjustably bias said transducer head toward said record surface; and a second limit stop adapted to coact with said first reed to adjustably limit such travel toward said record surface for preventing said transducer head from touching said record surface when the latter is at rest.

4. The apparatus of claim 3 wherein said first limit stop consists of a screw member introduced through a hole in said first reed and threading into said mounting beam member, said screw member having an enlarged head the bottom of which is pressing against the top surface of said first reed; and said second limit stop consists of a screw member threading into said mounting beam member and having a head adapted to engage the bottom surface of said first reed, said latter screw member being reached for adjustment thereof through an access hole in said first reed.

5. The apparatus of claim 3 wherein said shoe portion is coated with a smooth unctuous non-abrasive composition comprising ceramics and tetrafluoroethylene.

6. The apparatus of claim 3 wherein said mounting beam member supports a plurality of transducer heads.

References Cited in the file of this patent

UNITED STATES PATENTS

| | | |
|---|---|---|
| 2,863,004 | Maclay et al. | Dec. 2, 1958 |
| 2,905,933 | Canepa | Sept. 22, 1959 |
| 2,961,494 | Darou et al. | Nov. 22, 1960 |
| 3,069,667 | Doody | Dec. 18, 1962 |

FOREIGN PATENTS

| | | |
|---|---|---|
| 899,564 | Germany | Dec. 14, 1953 |